United States Patent
Hochmuth et al.

(10) Patent No.: US 7,589,737 B2
(45) Date of Patent: Sep. 15, 2009

(54) SYSTEM AND METHOD FOR COMMUNICATING GRAPHICS IMAGE DATA OVER A COMMUNICATION NETWORK

(75) Inventors: Roland M. Hochmuth, Fort Collins, CO (US); Johnny Marks, Fort Collins, CO (US); Robert P. Martin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 10/001,430

(22) Filed: Oct. 31, 2001

(65) Prior Publication Data

US 2003/0080971 A1 May 1, 2003

(51) Int. Cl.
*G09G 5/36* (2006.01)
*G06K 9/36* (2006.01)

(52) U.S. Cl. ........................ 345/545; 382/232
(58) Field of Classification Search ............... 345/619, 345/544, 545; 370/419, 465, 466; 382/232
See application file for complete search history.

(56) References Cited

U.S. PATENT DOCUMENTS

| | | | | |
|---|---|---|---|---|
| 5,296,936 A * | 3/1994 | Pittas et al. | ............... | 358/407 |
| 5,467,459 A * | 11/1995 | Alexander et al. | ............ | 711/153 |
| 5,485,570 A | 1/1996 | Busboom | | |
| 5,500,933 A * | 3/1996 | Schnorf | .................. | 715/500.1 |
| 5,502,727 A * | 3/1996 | Catanzaro et al. | .......... | 370/271 |
| 5,515,511 A * | 5/1996 | Nguyen et al. | .............. | 725/117 |
| 5,666,487 A * | 9/1997 | Goodman et al. | ........... | 709/246 |
| 5,706,290 A * | 1/1998 | Shaw et al. | ................ | 370/465 |
| 5,825,424 A * | 10/1998 | Canfield et al. | ........ | 375/240.15 |
| 5,936,616 A | 8/1999 | Torborg | | |
| 5,974,471 A | 10/1999 | Belt | | |
| 5,974,563 A * | 10/1999 | Beeler, Jr. | ..................... | 714/5 |
| 5,995,080 A * | 11/1999 | Biro et al. | ................... | 345/603 |
| 5,995,121 A * | 11/1999 | Alcorn et al. | ............... | 345/520 |
| 6,005,561 A * | 12/1999 | Hawkins et al. | ......... | 715/500.1 |
| 6,006,231 A * | 12/1999 | Popa | ......................... | 707/101 |
| 6,016,401 A * | 1/2000 | Rostoker et al. | ....... | 370/800.29 |
| 6,023,558 A * | 2/2000 | Grabowski | ................. | 358/1.9 |
| 6,044,445 A | 3/2000 | Tsuda | | |
| 6,075,523 A | 6/2000 | Simmers | | |
| 6,084,553 A | 7/2000 | Walls et al. | .................... | 345/1 |
| 6,101,536 A * | 8/2000 | Kotani et al. | ................ | 709/217 |
| 6,160,544 A * | 12/2000 | Hayashi et al. | ............. | 345/716 |
| 6,166,734 A | 12/2000 | Nahi | | |
| 6,215,486 B1 | 4/2001 | Walls et al. | ................. | 345/329 |
| 6,249,294 B1 * | 6/2001 | Lefebvre et al. | ............ | 345/504 |
| 6,294,982 B1 | 9/2001 | Hooks | | |
| 6,304,895 B1 * | 10/2001 | Schneider et al. | .......... | 709/203 |
| 6,343,313 B1 * | 1/2002 | Salesky et al. | ............. | 709/204 |
| 6,366,289 B1 | 4/2002 | Johns | | |

(Continued)

OTHER PUBLICATIONS

U.S. Appl. No. 10/004,191, Examiner's Answer to Appeal Brief dated May 1, 2008, pp. 1-10.

(Continued)

*Primary Examiner*—Ryan R Yang

(57) ABSTRACT

A graphics adapter comprises a frame buffer operable to store graphics image data. The graphics adapter also comprises a network interface operable to receive at least a portion of the graphics image data, the network interface further operable to format the received graphics image data into a plurality of packets for transmission over a communication network.

13 Claims, 6 Drawing Sheets

U.S. PATENT DOCUMENTS

| | | | |
|---|---|---|---|
| 6,400,730 B1* | 6/2002 | Latif et al. ............. | 370/466 |
| 6,466,203 B2 | 10/2002 | Van Ee | |
| 6,553,412 B1* | 4/2003 | Kloba et al. ............. | 709/219 |
| 6,593,937 B2* | 7/2003 | Ludtke et al. ............. | 345/629 |
| 6,621,870 B1* | 9/2003 | Gordon et al. ......... | 375/240.28 |
| 6,664,969 B1* | 12/2003 | Emerson et al. ........... | 345/544 |
| 6,704,024 B2 | 3/2004 | Robotham | |
| 6,882,755 B2* | 4/2005 | Silverstein et al. ......... | 382/282 |
| 6,891,973 B1* | 5/2005 | Atsumi et al. ............. | 382/232 |
| 6,924,813 B2* | 8/2005 | Selig et al. ................ | 345/562 |
| 6,999,068 B2* | 2/2006 | Sobol ....................... | 345/418 |
| 7,015,974 B2* | 3/2006 | Lee .......................... | 348/569 |
| 2002/0059589 A1* | 5/2002 | Park ......................... | 725/35 |
| 2002/0174254 A1 | 11/2002 | Kita | |
| 2002/0196378 A1 | 12/2002 | Slobodin | |
| 2003/0017846 A1 | 1/2003 | Estevez | |
| 2003/0046432 A1* | 3/2003 | Coleman et al. ............ | 709/247 |
| 2003/0058248 A1* | 3/2003 | Hochmuth et al. ......... | 345/537 |

OTHER PUBLICATIONS

U.S. Appl. No. 10/004,191, Final Rejection dated Nov. 11, 2007, pp. 1-8.
U.S. Appl. No. 10/004,191, Office Action dated May 16, 2007, pp. 1-7.
U.S. Appl. No. 10/004,191, Final Rejection dated Dec. 4, 2006, pp. 1-6 and attachments.
U.S. Appl. No. 10/004,191, Office Action dated Jun. 23, 2006, pp. 1-5 and attachments.
U.S. Appl. No. 10/004,191, Office Action dated Jan. 24, 2006, pp. 1-7 and attachments.
U.S. Appl. No. 10/004,191, Final Rejection dated Jul. 21, 2005, pp. 1-7 and attachments.
U.S. Appl. No. 10/004,191, Final Rejection dated Feb. 23, 2005, pp. 1-10.
U.S. Appl. No. 10/004,191, Office Action dated Aug. 2, 2004, pp. 1-7 and attachments.
G. Humphreys and P. Hanrahan. A Distributed Graphics System for Large Tiled Displays In Proceedings of the Conference on Visualization '99, Oct. 1999, pp. 215-223.
G. Humphreys and M. Eldridge, I. Buck, G. Stoll, M. Everett, and P. Hanrahan, WireGL: a Scalable Graphics System for Clusters in Proceedings of the 28th Annual Conference on Computer Graphics and Interactive Techniques, Aug. 2001, pp. 129-140.
G. Stoll et al. Lightning-2: a High-Performance Display Subsystem for PC Clusters In Proceedings of the 28th Annual Confrence on Computer Graphics and Interactive Techniques, Aug. 2001, pp. 141-148.
B. Schmidt, M. Lam and J. Northcutt, The Interactive Performance of SLIM: a Stateless, Thin-Client Architecture In Proceedings of the Seventeenth ACM Symposium on Operating Systems Principles, vol. 33, Issue 5, Dec. 1999, pp. 32-47.
Sun Microsystems: Sun Ray Appliances: The Network is the Computer, published (Jul. 2001, list on last page, right bottom corner), pp. 1-6.

\* cited by examiner

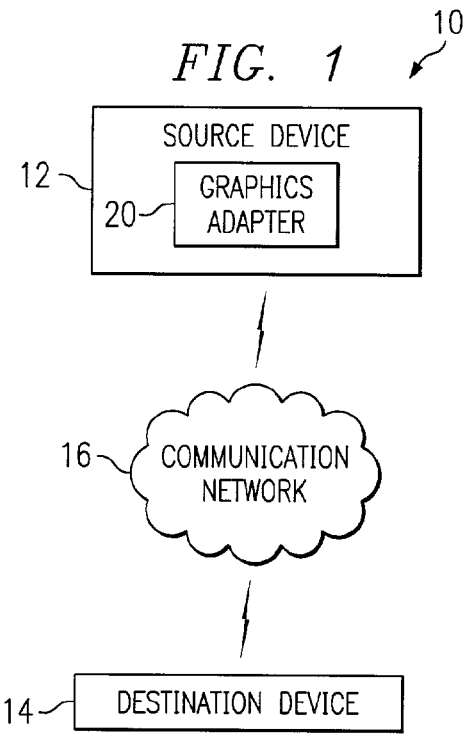
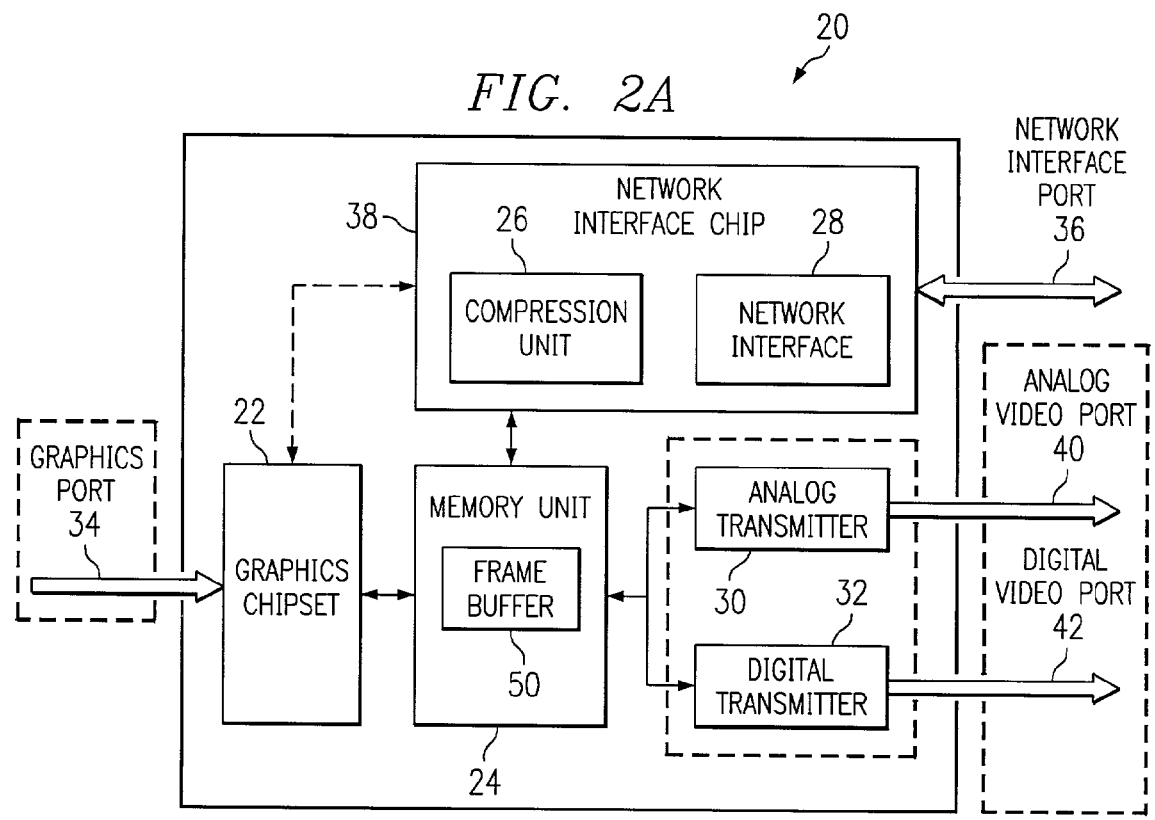

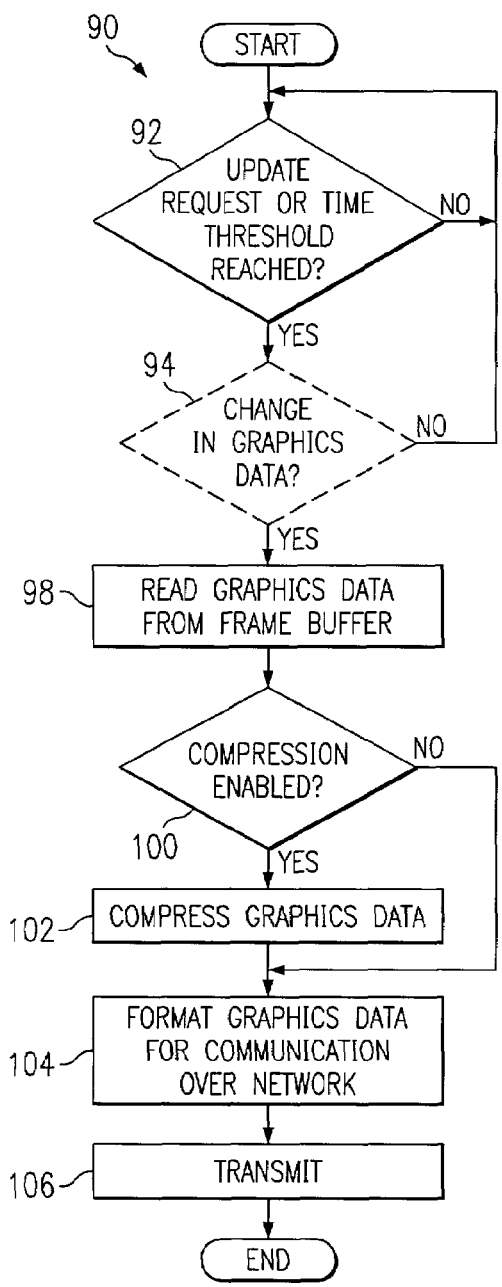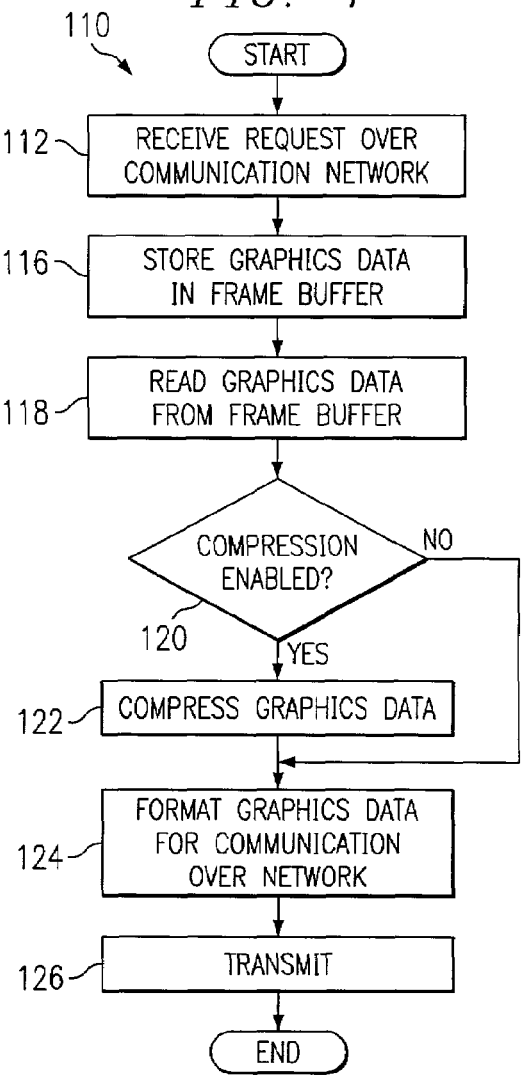

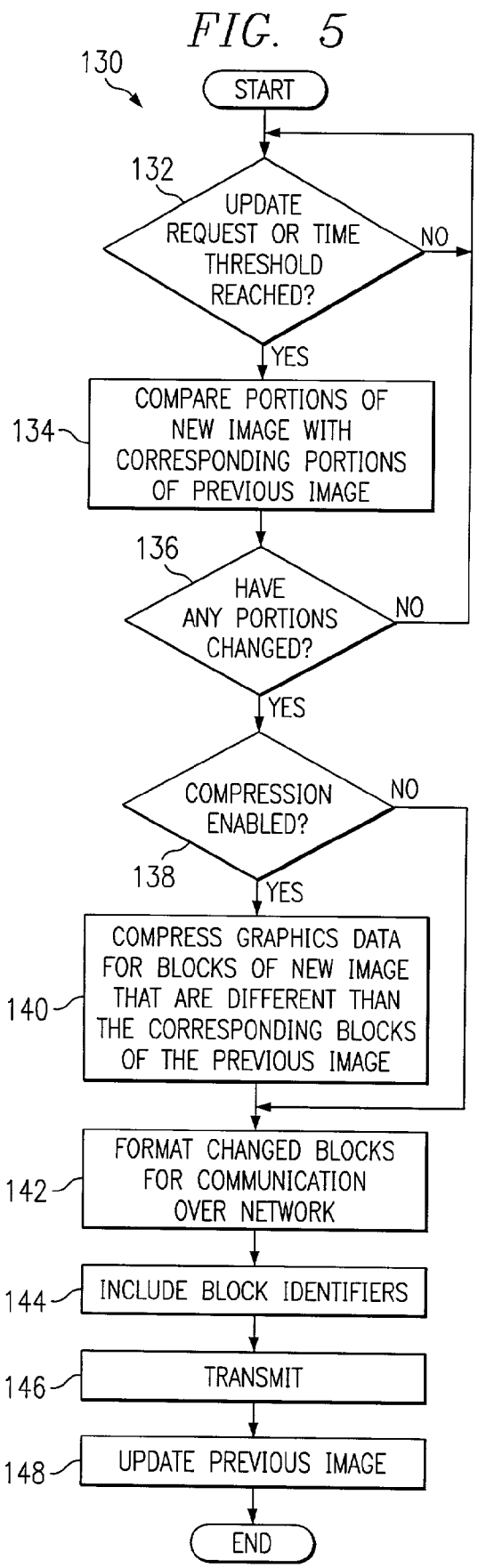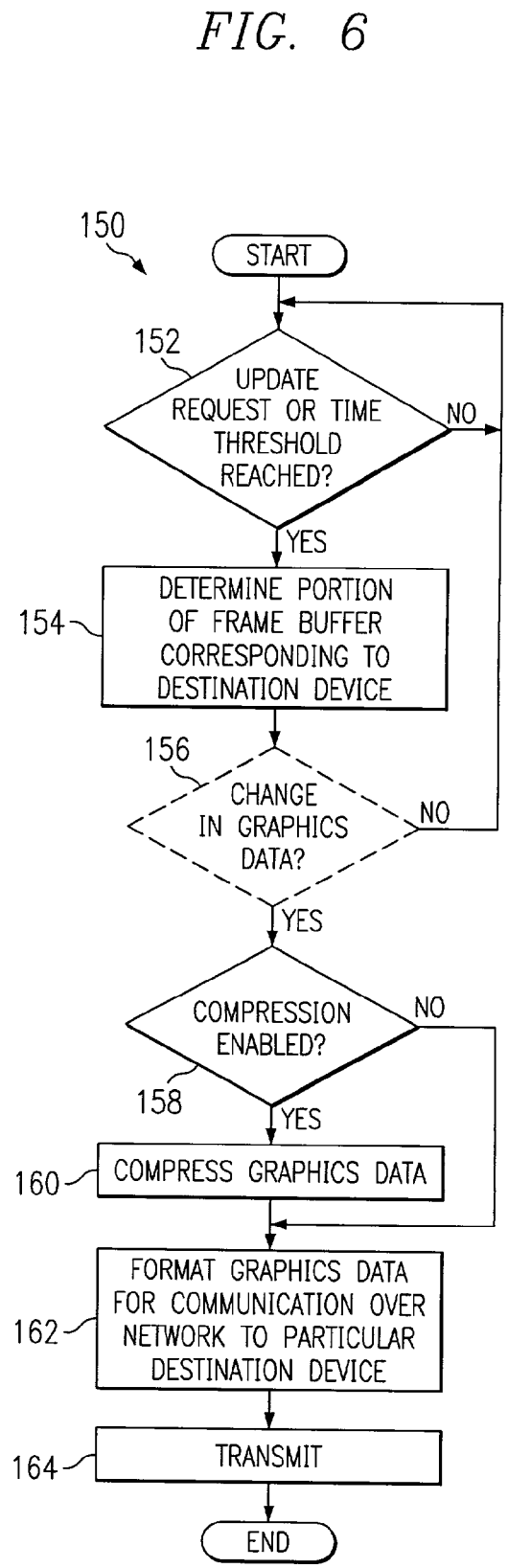

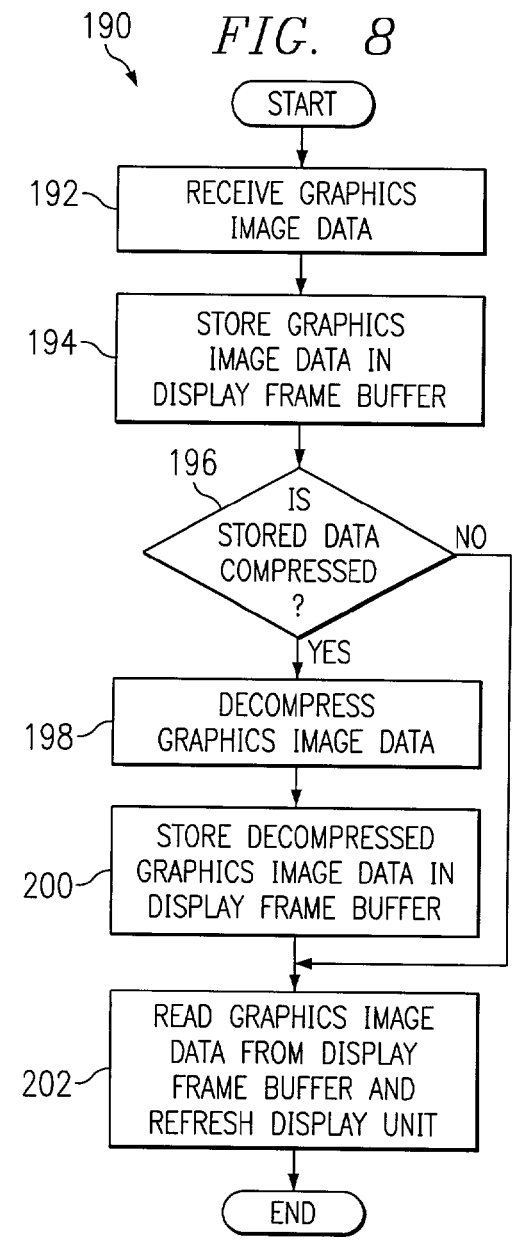
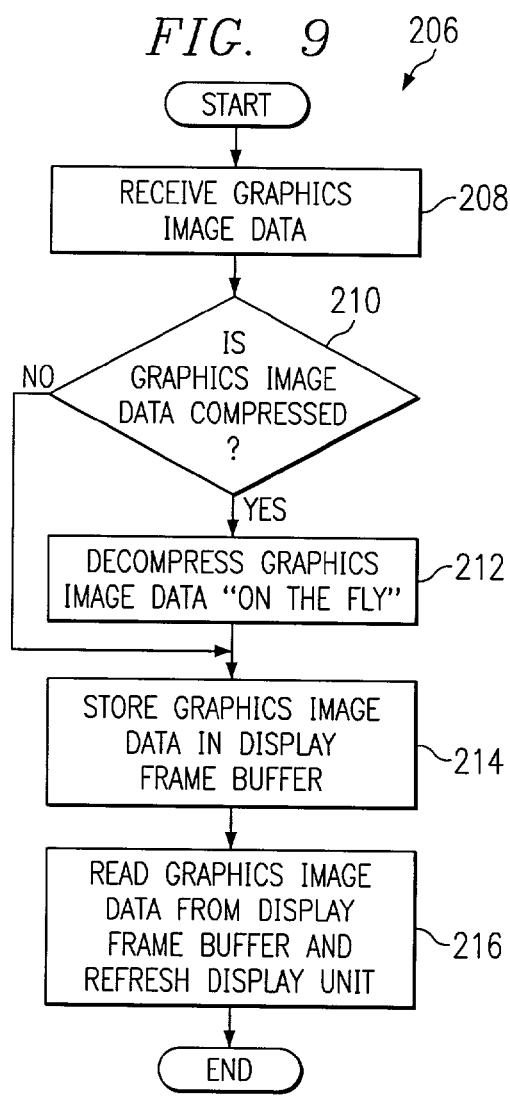

SYSTEM AND METHOD FOR COMMUNICATING GRAPHICS IMAGE DATA OVER A COMMUNICATION NETWORK

CROSS-REFERENCE TO RELATED APPLICATION

This patent application is related to co-pending U.S. patent application Ser. No. 10/004,191, entitled "SYSTEM AND METHOD FOR DISPLAYING AN IMAGE ON A NETWORK ATTACHABLE DISPLAY DEVICE," filed Oct. 31, 2001, co-assigned herewith.

TECHNICAL FIELD OF THE INVENTION

The present invention relates generally to the field of computer systems, and more particularly to a system and method for communicating graphics image data over a communication network.

BACKGROUND OF THE INVENTION

In existing computer systems, a user's input intended to modify the image on the display is transmitted as a command with the associated data from a CPU to a graphics adapter over an AGP (Accelerated Graphics Port) and a PCI (Peripheral Component Interconnect) bus. A graphics chip on the graphics adapter renders the image based at least in part on the received command. Graphics image data associated with the rendered image is stored in a frame buffer. The image information is typically stored in the frame buffer in a digital format. The digital data stored in the frame buffer controls the color and intensity of every pixel on the display. The graphics adapter may include a RAMDAC (Random Access Memory Digital-to-Analog Converter) to convert graphics image data stored in the frame buffer from digital to analog form for display on an analog display.

The RAMDAC may be part of or separate from a display refresh unit. Depending on the refresh rate of the display, the display refresh unit frequently reads the contents of the frame buffer. If desired, the RAMDAC may convert the information into analog form and send it to the monitor. Thus, for a 1280×1024 pixel display using 24 bits per pixel, approximately 4 MB of data has to be read from the frame buffer for each refresh of the display. If the refresh rate of the display is 70 times per second, then approximately 280 MB of data is transmitted from the graphics adapter every second.

Two resources in the graphics adapter compete for the same frame buffer—the rendering unit and the display refresh unit. The rendering unit and the display refresh unit may be part of the same graphics chip. Because of the frequent and constant access of the frame buffer by the display refresh unit required to transfer large amounts of data, the rendering performance of the graphics adapter is adversely affected.

Furthermore, it is often desirable to display graphics information that is generated by a computer on a remote display monitor. Sometimes it is desirable to provide this type of remote graphics display across a communication network. One approach to providing graphics image data to a remote display involves reading data from the frame buffer back into the memory of the computer system, compressing the data, assembling the data into IP (Internet Protocol) packets, and then sending the packets to the destination computer over the communication network.

The destination computer receives the compressed image via a network interface card and stores it in system memory. The compressed image is transmitted to a PCI card where it is decompressed. The decompressed image is transmitted back to the system memory. The decompressed image is then transmitted to a graphics adapter on the destination computer via an AGP or a PCI bus. The graphics adapter transmits video signals over a video cable to the display, typically a CRT (Cathode Ray Tube), or LCD (Liquid Crystal Display) to display the graphics image. It may be seen from the foregoing that there is considerable data movement on the destination computer which increases the latency.

SUMMARY OF THE INVENTION

In accordance with an embodiment of the present invention, a graphics adapter comprises a frame buffer operable to store graphics image data. The graphics adapter also comprises a network interface operable to receive at least a portion of the graphics image data, the network interface further operable to format the received graphics image data into a plurality of packets for transmission over a communication network.

In accordance with another embodiment of the present invention, a method for transmitting graphics image data over a communication network is disclosed. The method comprises logically dividing a frame buffer of a graphics adapter into a plurality of segments, each of the plurality of segments storing graphics image data corresponding to a destination device of a plurality of destination devices; selecting a segment of the plurality of segments corresponding to a destination device of the plurality of destination devices; and formatting at least a portion of the graphics image data stored in the selected segment into a plurality of packets for transmission by a network interface of the graphics adapter to the destination device over the communication network.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a block diagram of an exemplary system in which a graphics adapter of the present invention may be used;

FIGS. 2A-2B are logical block diagrams of a graphics adapter in accordance with different embodiments of the present invention;

FIG. 3 is a flowchart describing the operation of a graphics adapter in accordance with an embodiment of the present invention.

FIG. 4 is a flowchart describing the operation of a graphics adapter in accordance with another embodiment of the present invention;

FIG. 5 is a flowchart describing the operation of a graphics adapter in accordance with a further embodiment of the present invention;

FIG. 6 is a flowchart describing the operation of a graphics adapter in accordance with yet another embodiment of the present invention;

FIG. 8 is a flowchart describing the operation of a network attachable display device in accordance with an embodiment of the present invention; and FIG. 9 is a flowchart describing the operation of a network attachable display device in accordance with another embodiment of the present invention.

DETAILED DESCRIPTION OF THE DRAWINGS

Figure 2B:
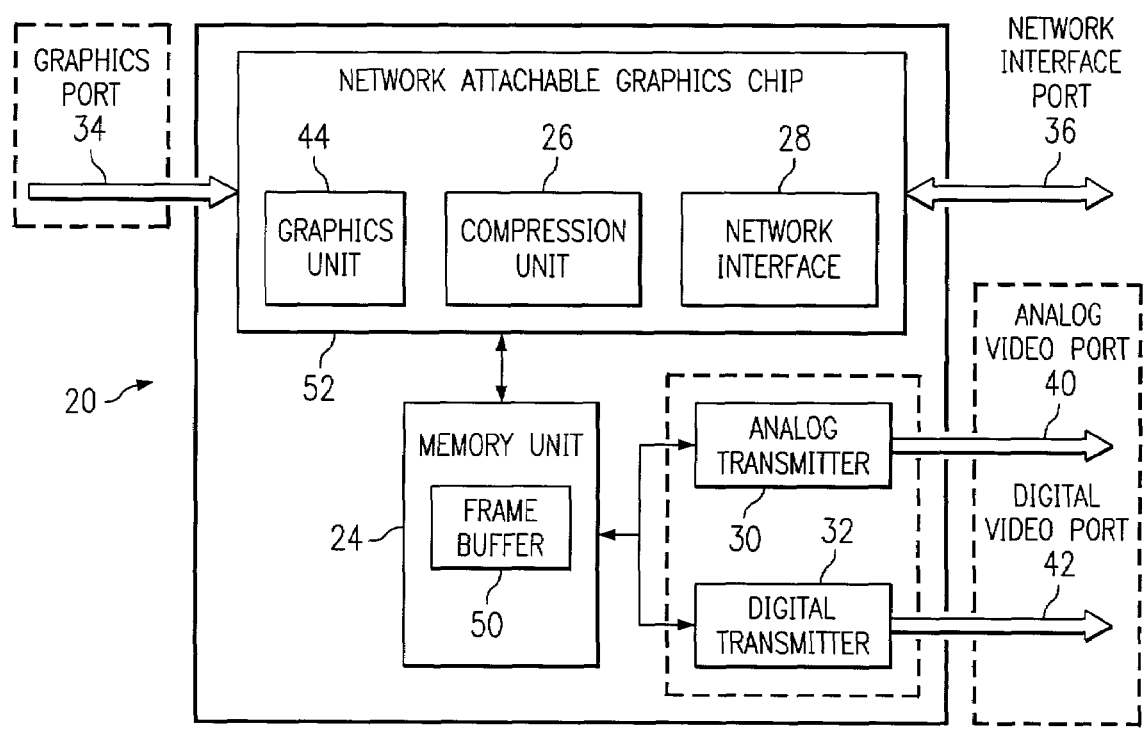

The preferred embodiment of the present invention and its advantages are best understood by referring to FIGS. 1 through 9 of the drawings, like numerals being used for like and corresponding parts of the various drawings.

There is a desire for an improved system and method for communicating graphics image data over a communication network, such as a computer network. Accordingly, a graphics adapter comprising a compression unit and a network interface, capable of communicating with a destination device, such as a remote computer, over a communication network, such as a computer network, is disclosed. The graphics adapter also includes a memory unit, such as a frame buffer. In addition to or in place of one or more video output ports, such as analog video ports, Digital Visual Interface (DVI) video ports, and the like, that are included in existing graphics adapters, the graphics adapter in accordance with the present invention may be provided with a network interface port, for example an Ethernet port, an Infiniband port, a fiber port, a wireless network transceiver, and the like. The network interface port may be used for transmitting the contents of the frame buffer in either compressed or uncompressed form via the computer network to one or more remote computers.

FIG. 1 is a block diagram of an exemplary system 10 in which the graphics adapter of the present invention may be used. System 10 preferably comprises at least one source device 12, such as at least one processor-based system, for example computers, and at least one destination device 14. Destination device 14 may comprise, for example a display device capable of being directly coupled to a communication network, a display associated with a computer, and the like. One or more source devices 12 may communicate with each other over a communication network (not shown), such as a local area network. Source device 12 preferably communicates with destination device 14 over a communication network 16. Communication network 16 may comprise an intranet, an extranet and/or the Internet.

Source device 12 may comprise a graphics adapter 20. However, in alternative embodiments, graphics adapter 20 may not be part of source device 12. In such an embodiment, graphics adapter 20 may be coupled directly to communication network 16.

FIG. 2A is a logical block diagram of a graphics adapter 20 in accordance with an embodiment of the present invention. Graphics adapter 20 comprises a network interface chip 38 coupled to a memory unit 24. A graphics chipset 22 is also preferably coupled to memory unit 24. Network interface chip 38 preferably comprises a compression unit 26 and a network interface 28. If desired, graphics adapter 20 may also comprise at least one video transmitter, for example an analog transmitter 30 and a digital transmitter 32, coupled to memory unit 24. Preferably, analog transmitter 30 and digital transmitter 32 are also coupled to each other. If desired, network interface chip 38 may be coupled to graphics chipset 22.

Graphics chipset 22 is a conventional graphics chipset which renders the image to be displayed on destination device 14. The image may be rendered based at least in part on instructions received from a memory unit of source device 12 or instructions received from destination device 14. Instructions from source device 12 are preferably received via a graphics port 34. Graphics port 34 may be a Peripheral Component Interconnect (PCI) port, an Accelerated Graphics Port (AGP), an Infiniband Port, a fiber port and the like. In an alternative embodiment, instructions may be received via a network interface port 36. In such an embodiment, graphics adapter 20 may not include graphics port 34. Rendering of an image typically comprises translating high-level instruction to bitmap images which are a matrix of pixels. The process of rendering is known in the art and as such will not be described in detail herein.

Memory unit 24 preferably comprises a frame buffer 50. Frame buffer 50 is used to store information about the rendered image. Frame buffer 50 may store information, such as color, transparency values, depth and/or the like, for each pixel in the rendered image.

Compression unit 26 of network interface chip 38 preferably compresses the data stored in frame buffer 50. Compression unit 26 includes compression logic optimized for use with graphics image data stored in frame buffer 50. However, the invention is not so limited and any kind of compression logic may be used by compression unit 26. Compression unit 26 may be implemented using general-purpose hardware components, such as a digital signal processor or microprocessor, and appropriate software for controlling the operation of the hardware components. If desired, compression unit 26 may be implemented using dedicated hardware, an Application Specific Integrated Circuit (ASIC) or a Field Programmable Gate Array (FPGA) that is specially designed for carrying out the compression.

Network interface 28 formats the graphics image data for transmission over a network, such as communication network 16. A network interface port 36, for example an Ethernet port, an Infiniband port, a fiber port, a wireless network transceiver, and the like, is preferably coupled to network interface chip 38. Network interface 28 converts the graphics image data into packets to be transmitted to destination device 14 via network interface port 36 over communication network 16. The graphics image data may be obtained by network interface 28 either from compression unit 26 or from frame buffer 50. For example, in one embodiment, graphics image data from frame buffer 50 may be compressed by compression unit 26 and provided to network interface 28. In another embodiment, after compressing the graphics image data, compression unit 26 may provide the data back to frame buffer 50 and network interface 28 may read the compressed graphics image data directly from frame buffer 50. In yet another embodiment, for example when compression of graphics image data is not desired, network interface 28 may read graphics image data directly from frame buffer 50.

Analog transmitter 30 comprises a conventional RAM-DAC and may be used to convert graphics image data stored in memory unit 24 from digital format into an analog format to be transmitted to an analog device, such as an analog monitor which may be coupled to source device 12, via analog video port 40. Digital transmitter 32 comprises a conventional Digital Visual Interface (DVI) transmitter and may be used to transmit graphics image data in digital format from memory unit 24 to a digital device, such as a digital monitor which may be coupled to source device 12, via digital video port 42.

FIG. 2B is a logical block diagram of graphics adapter 20 in accordance with another embodiment of the present invention. Graphics adapter 20 as shown in FIG. 2B comprises a network attachable graphics chip 52 coupled to memory unit 24. Network attachable graphics chip 52 comprises a graphics unit 44, compression unit 26 and network interface 28. If desired, graphics adapter 20 may also comprise at least one video transmitter, for example analog transmitter 30 and digital transmitter 32, coupled to memory unit 24. Preferably, analog transmitter 30 and digital transmitter 32 are also coupled to each other. In graphics adapter 20 of FIG. 2B, network interface port 36 is preferably coupled to network attachable graphics chip 52. Graphics unit 44 performs substantially the same function as graphics chipset 22 of FIG. 2A.

One of the advantages of graphics adapter 20 of FIG. 2B over the embodiment of FIG. 2A is that the manufacturing cost of the graphics adapter can be reduced as only one chip, network attachable graphics chip 52, is used in the embodiment of FIG. 2B.

In an alternative embodiment, graphics adapter 20 does not include analog transmitter 30 or digital transmitter 32. In yet another embodiment, graphics adapter 20 does not include analog video port 40 and digital video port 42; graphics image data is transmitted to source device 12 via network interface port 36.

In yet another embodiment of the present invention, graphics adapter 20 does not include graphics port 34 for receiving graphics commands. Instead graphics adapter 20 receives graphics commands over communication network 16 via network interface port 36. The graphics command may be received from source device 12 or from destination device 14.

FIG. 3 is a flowchart 90 describing the operation of graphics adapter 20 in accordance with an embodiment of the present invention. In step 92, the graphics adapter waits for either the lapse of a predetermined period of time or the receipt of an update request. The predetermined period of time may be dependent upon the refresh rate of a display associated with destination device 14. Destination device 14 itself may be the display. The update request may be received by graphics adapter 20 from source device 12 via graphics port 34. The request may also be received by the graphics adapter from destination device 14 via network interface port 36 over communication network 16.

Upon the occurrence of one of the above events, a determination is made in step 94 as to whether the graphics image data in frame buffer 50 has been changed since the last update. If the graphics image data in frame buffer 50 has not been changed, then the process starting at step 92 is repeated. The step of determining whether the graphics image data in frame buffer 50 has been changed is optional and has been shown in FIG. 3 by dashed lines.

In the preferred embodiment of step 94, a flag is read to determine whether the graphics image data in frame buffer 50 associated with the destination device has been updated since the last transmission. The flag may have been previously set by graphics chipset 22 during a write to frame buffer 50. For example, when information for each pixel is written into frame buffer 50, the pixel value could be compared with a previously stored value, and the flag is set if there has been a change. If desired, the particular region of frame buffer 50 associated with the destination device that has changed may also be tracked, for example by tracking the minimum and maximum values in the x and y coordinates for the region that has changed.

In step 98, graphics image data from frame buffer 50 is read by compression unit 26. If desired, color coalescing may be performed in this step. A Display Refresh Unit (DRU) may perform the task of color coalescing. The DRU may be part of the network interface chip or may be coupled to the network interface chip. Color coalescing is the process of merging images of multiple display surfaces, such as a primary display surface and one or more overlay planes into a single image. One or more color look-up tables containing colors for the pixels may be stored in registers (not shown) on graphics chipset 22. A window identifier may be used to determine the color look-up table to be used. Based on the value for the pixels stored in frame buffer 50, the colors for the pixels are obtained from the determined color look-up table.

In step 100, a determination is made as to whether compression is enabled. A compression bit within a register (not shown) on graphics chipset 22 may be read to determine if compression is enabled or not. If compression is enabled, then in step 102, graphics image data read from frame buffer 50 is compressed preferably by compression unit 26. Preferably, a compression algorithm optimized for compressing graphics image data read from frame buffer 50 is used. However, any of a variety of compression algorithms may be used by compression unit 26 to compress the data read from frame buffer 50. After compression, compression unit 26 may write the compressed data back to frame buffer 50. Compression of graphics image data prior to transmission over communication network 16 significantly reduces the amount of data that is transmitted over communication network 16.

If, in step 100, it is determined that compression is not enabled, then execution proceeds directly to step 104. In step 104, graphics image data is formatted for communication over communication network 16, preferably by network interface 28. Network interface 28 may read graphics image data from frame buffer 50 or may receive graphics image data directly from compression unit 26. In a preferred embodiment, graphics image data, whether in compressed form or in uncompressed form, is formatted into a plurality of packets suitable for transmission over communication network 16 using a communication protocol, such as Internet Protocol (IP). The formatted data packets include, among other things, identification information of destination device 14 to which the graphics image data is to be transmitted. Identification information may include for example an IP address of destination device 14. Identification information about destination device 14 may be received by graphics adapter 20 either from source device 12 or from destination device 14 itself.

In step 106, the formatted graphics image data is transmitted over communication network 16 to destination device 14, preferably as one or more Internet Protocol (IP) packets. The packets include a portion of the graphics image data (payload) and identification information about destination device 14. If desired, the same graphics image data may be transmitted to more than one destination device 14. This may be accomplished, for example, by creating data packets with the same payload but different identification information corresponding to the different destination devices. If desired, the formatted graphics image data may be transmitted via graphics port 34 to source device 12. Transmitting the graphics image data to source device 12 allows the source device to perform further processing of the graphics image data as desired. By transmitting packets with the same payload to more than one destination device, the same data may be presented to users of multiple destination devices, thereby enabling sharing of graphics image data by these multiple users. If desired, different graphics image data may be transmitted from graphics adapter 20 to the different users as described herein with reference to FIG. 6.

FIG. 4 is a flowchart 110 describing the operation of a graphics adapter in accordance with another embodiment of the present invention. In step 112, the graphics adapter receives a request for an updated image from destination device 14. The request is received preferably over communication network 16 via network interface port 36. Information identifying destination device 14 may also be received from destination device 14.

In step 116, graphics image data is stored in frame buffer 50. In step 118, graphics image data from frame buffer 50 is read preferably by compression unit 26. If desired, color coalescing may be performed in this step. In step 120, a determination is made as to whether compression is enabled.

If compression is enabled, then in step 122, graphics image data read from frame buffer 50 is compressed preferably by compression unit 26.

If, in step 120, it is determined that compression is not enabled, then execution proceeds directly to step 124. In step 124, the graphics image data is formatted for communication over communication network 16, preferably by network interface 28. Network interface 28 may read graphics image data from frame buffer 50 or may receive graphics image data directly from compression unit 26. In a preferred embodiment, graphics image data, whether in compressed form or in uncompressed form, is formatted into a plurality of packets suitable for transmission over communication network 16 using a communication protocol, such as Internet Protocol (IP). The formatted data packets include, among other things, identification information of destination device 14 to which the graphics image data is to be transmitted. Identification information may include for example an IP address of destination device 14. In step 126, the formatted graphics image data is transmitted over communication network 16 to destination device 14, preferably as one or more IP packets.

FIG. 5 is a flowchart 130 describing the operation of a graphics adapter in accordance with a further embodiment of the present invention. In the method of flowchart 130 only the portions of the frame buffer that have changed since the last update are transmitted to destination device 14. Graphics image data for a display may be effectively partitioned into a plurality of blocks, for example 16,384 blocks. As mapped to a display, these blocks may comprise an array of 128 blocks by 128 blocks. In a display having a resolution of 1,280 pixels by 1,024 pixels, each block has a corresponding resolution of 10 pixels by 8 pixels. However, the present invention is not so limited and a number of different block sizes may be chosen based upon system resources, the nature of the graphics image data to be transmitted, and a number of other factors.

Preferably, frame buffer 50 of graphics adapter of FIGS. 2A-2B stores information about both a new image and a previous image so that comparisons between the two images may be made. In step 132, the graphics adapter waits for either the lapse of a predetermined period of time or the receipt of an update request. The predetermined period of time may be dependent upon the refresh rate of a display associated with destination device 14. The request for an update may be received from source device 12 with which the graphics adapter is associated via graphics port 34. The request may be received by the graphics adapter from destination device 14 via network interface port 36 over communication network 16.

In step 134, portions or blocks of the graphics image data stored in the frame buffer corresponding to the new image are compared to corresponding portions or blocks of the graphics image data stored in the frame buffer corresponding to the previous image. In step 136, a determination is made as to whether any portions have changed since the last update. If the graphics image data has not been changed then the process starting at step 132 is repeated.

In step 138, a determination is made as to whether compression is enabled. If compression is enabled, then in step 140, graphics image data for portions or blocks of the new image that are determined to be different from the corresponding portions or blocks of the previous image are compressed. In an alternative embodiment, only those blocks that have changed since the last update and are within a "region of interest" specified by destination device 14 are compressed. This may be desirable, for example, when destination device 14 only desires to update specific portions of its display, for example a specific window of a plurality of windows.

If, at step 138, it is determined that compression is not enabled, then execution proceeds directly to step 142. In step 142, graphics image data for blocks that have changed is formatted for communication over communication network 16, preferably by network interface 28. In a preferred embodiment, graphics image data in any block with any change at all from the previously stored block may be formatted. If desired, some threshold for change may be set. The graphics adapter may be configured to evaluate the degree or amount of change and format the graphics image data only if it has changed by some predetermined amount.

Network interface 28 may read graphics image data from frame buffer 50 or may receive graphics image data directly from compression unit 26. In a preferred embodiment, graphics image data associated with any blocks that have changed, whether in compressed form or in uncompressed form, is formatted into a plurality of packets suitable for transmission over communication network 16 using a communication protocol, such as Internet Protocol (IP). A packet may include one or more blocks of graphics image data. The formatted data packets include, among other things, identification information of destination device 14 to which the graphics image data is to be transmitted. Identification information may include for example an IP address of destination device 14. Identification information about destination device 14 may be provided to the graphics adapter either from source device 12 or from destination device 14 itself.

In step 144, block identifiers (IDs) are added to the packets of data to be transmitted. The block ID information is preferably used by destination device 14 for updating a display associated with it. A block ID identifies the particular block for which graphics image data is being transmitted. A block ID may be a block number. If desired, the minimum and maximum values in the x and y coordinates ($X_{min}$, $X_{max}$, $Y_{min}$, $Y_{max}$) for the block may be used as the block ID. The four corners of the block that is identified by the minimum and maximum values in the x and y coordinates are given by ($X_{min}$, $Y_{min}$), ($X_{max}$, $Y_{min}$), ($X_{max}$, $Y_{max}$) and ($X_{min}$, $Y_{max}$).

In step 146, formatted graphics image data is transmitted over communication network 16 to destination device 14, preferably as one or more IP packets. If, desired, formatted graphics image data may be transmitted over graphics port 34 to source device 12. The same graphics image data may be transmitted to one or more destination devices 14. This may be accomplished, for example, by creating data packets with the same payload but including identification information, such as IP addresses, for different destination devices in the data packets.

In step 148, one or more blocks of frame buffer 50 corresponding to the previous image are updated. Preferably, only the blocks of the frame buffer associated with the previous image that have changed are overwritten by graphics image data for the corresponding blocks of the new image. If desired, the entire portion of the frame buffer associated with the previous image may be overwritten by graphics image data from the frame buffer associated with the new image.

It may be desirable to periodically transmit an entire frame buffer associated with a display to avoid problems that may occur due to packets lost in transmission or otherwise. If desired, destination device 14 may be configured to transmit acknowledgements back to the graphics adapter to better ensure proper synchronization between the graphics adapter and destination device 14.

FIG. 6 is a flowchart 150 describing the operation of a graphics adapter in accordance with yet another embodiment of the present invention. The method as described herein with reference to FIG. 6 may be used to provide support for multiple destination devices by the same graphics adapter. The graphics adapter of the present invention may be used to render graphics for multiple destination devices, such as multiple computers, coupled to communication network 16. Graphics image data may be transmitted from the graphics adapter to the destination devices via network interface port 36 over communication network 16 without the need for separate ports for the different destination devices. Thus, the number of destination devices that may be supported is not limited by the number of physical ports associated with the graphics adapter.

In step 152, the graphics adapter waits for either the lapse of a predetermined period of time or the receipt of an update request. The predetermined period of time may be dependent upon the refresh rate of a display associated with a destination device. The request for an update may be received by the graphics adapter from source device 12 with which the graphics adapter is associated via graphics port 34. The request may be received by the graphics adapter from destination device 14 via network interface port 36 over communication network 16.

Upon the occurrence of one of the above events, in step 154, the portion of frame buffer 50 corresponding to destination device 14 to which graphics image data is to be transmitted is determined. In the preferred embodiment, a destination device table may be looked up to determine the portion of the frame buffer 50 corresponding to the destination device. The destination device table preferably includes information about one or more destination devices, such as identification information of the destination device, the region of frame buffer 50 assigned to the destination device, information indicating whether graphics image data corresponding to the destination device has changed, and/or the like.

In step 156 a determination is made as to whether the graphics image data corresponding to the destination device in frame buffer 50 has been changed since the last update. If the graphics image data in frame buffer 50 has not been changed, then the process starting at step 152 is repeated. The step of determining whether the graphics image data in frame buffer 50 has been changed is optional and has been shown in FIG. 6 by dashed lines.

In step 158, a determination is made as to whether compression is enabled. If compression is enabled, then in step 160, graphics image data stored in the portion of frame buffer 50 associated with the particular destination device is compressed preferably by compression unit 26.

If, in step 158, it is determined that compression is not enabled, then execution proceeds directly to step 162. In step 162, the graphics image data associated with the particular destination device 14 is formatted for communication over communication network 16, preferably by network interface 28. Network interface 28 may read graphics image data from frame buffer 50 or may receive graphics image data directly from compression unit 26. In a preferred embodiment, graphics image data, whether in compressed form or in uncompressed form, is formatted into a plurality of packets suitable for transmission over communication network 16 using a communication protocol, such as Internet Protocol. The formatted data packets include, among other things, identification information of destination device 14 to which the graphics image data is to be transmitted. Identification information may include for example an IP address of the particular destination device 14. Identification information about destination device 14 may be received by the graphics adapter either from source device 12 or from destination device 14 itself.

In step 164, the formatted graphics image data is transmitted over communication network 16 to destination device 14, preferably as one or more IP packets.

A technical advantage of an exemplary embodiment of the graphics adapter of the present invention is that graphics image data does not have to be transferred back into the memory of the source computer in order to be transferred to a destination device. Because the graphics adapter may be directly connected to a communication network, graphics image data from the graphics adapter may be directly transmitted over the communication network to the destination device. Another technical advantage of an exemplary embodiment of the graphics adapter of the present invention is that graphics image data of the frame buffer is transmitted to the destination device only if the contents of the frame buffer have changed. Moreover, if desired, graphics image data for only particular regions of interest, for example, the blocks of the frame buffer that have changed, may be transmitted, thereby eliminating the need to transmit the contents of the entire frame buffer with every update.

Moreover, the graphics image data may be tagged or addressed and sent to more than one destination device. Thus, multiple destination devices may be simultaneously supported by the same graphics adapter without being limited by the number of physical ports associated with the graphics adapter. The multiple destination devices may be provided with the same image data thereby allowing multiple users to collaborate on the same project. If desired, different portions of the frame buffer may be allocated to different destination devices and the multiple destination devices provided with different data.

Figure 7A:
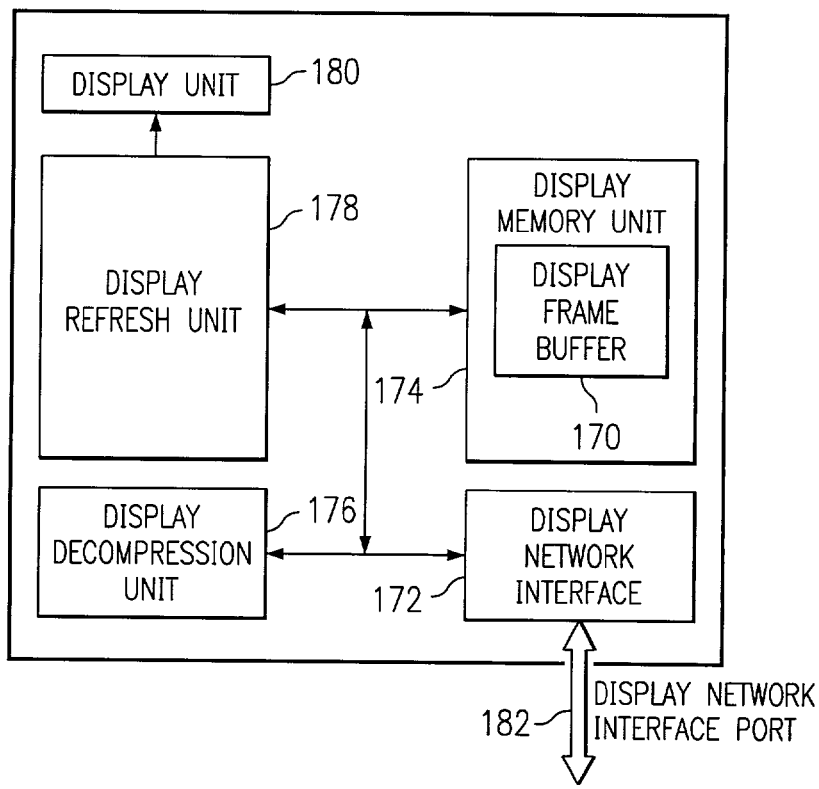
FIGS. 7A-7B are logical block diagrams of a network attachable display device in accordance with different embodiments of the present invention.

FIG. 7A is a logical block diagram of a network attachable display device 14 in accordance with an embodiment of the present invention. Network attachable display device 14 comprises a display network interface 172 coupled to a display memory unit 174, a display decompression unit 176 and a display refresh unit 178. Display memory unit 174 is also coupled to display decompression unit 176 and display refresh unit 178. Display decompression unit 176 is also coupled to display refresh unit 178 and display refresh unit 178 is also coupled to a display unit 180.

Network attachable display device 14 of the preferred embodiment is capable of being coupled to a communication network, such as communication network 16. Thus, network attachable display device 14 may communicate with other devices coupled to communication network 16 and may receive and/or transmit commands and/or data to and from such devices over communication network 16 via network interface port 182.

Display network interface 172 is operable to receive data, such as graphics image data, from a source device, such as source device 12, graphics adapter 20, a graphics appliance, and/or the like, over a communication network, such as communication network 16, via a display network interface port 182, for example an Ethernet port, an Infiniband port, a fiber port, a wireless network transceiver, and the like. The graphics image data is preferably received in a packetized format.

Display memory unit 174 preferably comprises a display frame buffer 170. Display frame buffer 170 is used to store graphics image data that is to be displayed on display unit 180. The graphics image data may be stored in display frame buffer 170 in either compressed or decompressed form. Display frame buffer 170 may store information, such as color for each pixel to be displayed on display unit 180.

Display decompression unit 176 preferably decompresses the data received by display network interface 172. Display decompression unit 176 includes decompression logic optimized for use with graphics image data. However, the invention is not so limited and any kind of decompression logic may be used by display decompression unit 176. Display decompression unit 176 may be implemented using general-purpose hardware components, such as a digital signal processor or microprocessor, and appropriate software for controlling the operation of the hardware components. If desired, display decompression unit 176 may be implemented using dedicated hardware, an ASIC or a FPGA that is specially designed for carrying out the decompression. In the embodiment shown in FIG. 7A, display decompression unit 176 is also coupled to display network interface 172 and display refresh unit 178.

Display refresh unit 178 is a conventional display refresh unit typically used in graphics adapters. In the embodiment shown in FIG. 7A, display refresh unit 178 is coupled to display unit 180. Display unit 180 preferably comprises a CRT (Cathode Ray Tube). In alternative embodiments, display unit 180 may comprise a Liquid Crystal Display (LCD), a Thin Film Transistor (TFT), a Light Emitting Diode (LED), organic polymers and/or the like now known or later developed. Depending on the display refresh rate of display unit 180, display refresh unit 178 reads the graphics image data from display frame buffer 170 frequently and refreshes display unit 180 at the refresh rate of display unit 180.

Display unit 180 is preferably logically divided into horizontal segments. Preferably display unit 180 is refreshed starting from the top left corner of the desired portion of display unit 180 and moving to the right. Once a horizontal segment of display unit 180 is refreshed, the next horizontal segment is refreshed starting from the left and moving to the right until the desired portion of display unit 180 is refreshed. This process is repeated frequently depending on the display refresh rate of display unit 180.

Figure 7B:
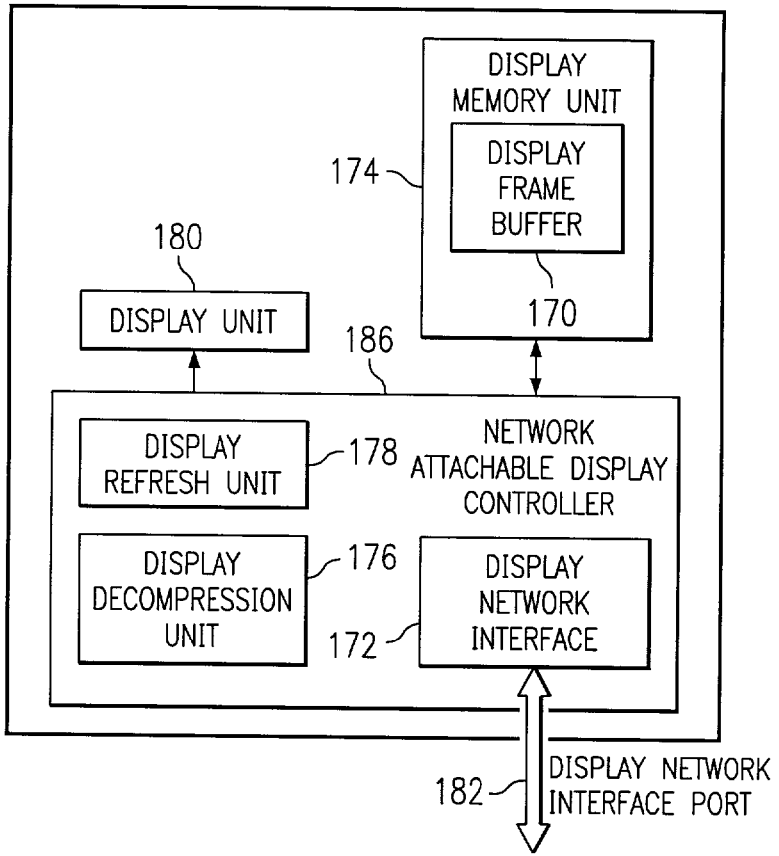

FIG. 7B is a logical block diagram of a network attachable display device 14 in accordance with another embodiment of the present invention. Network attachable display device 14 as shown in FIG. 7B comprises a network attachable display controller 186 coupled to display memory unit 174 and display unit 180. Network attachable display controller 186 comprises display network interface 172, display decompression unit 176 and display refresh unit 178. In network attachable display device 14 of FIG. 7B, display network interface port 182 is coupled to network attachable display controller 186.

One of the advantages of network attachable display device 14 of FIG. 7B over network attachable display device 14 of FIG. 7A is that the manufacturing cost of the network attachable display device can be reduced as a single chip, network attachable display controller 186, includes the functionality of display network interface 172, display decompression unit 176 and display refresh unit 178.

FIG. 8 is a flowchart 190 of a method of operation of a network attachable display device in accordance with an embodiment of the present invention. In step 192, graphics image data is received from a source device, such as a computer, a graphics device, a server, an Internet appliance and/or the like, for example source device 12 or graphics adapter 20, over a communication network, such as communication network 16, via display network interface port 182. The data is received preferably as a plurality of packets. Display network interface 172 assembles the received data in a format suitable for storage in display frame buffer 170. For example, if the packets of data include information indicating the portions of display unit 180 with which the data included in the packets are associated, then display network interface 172 stores the data in the appropriate portions of display frame buffer 170.

In step 194, the assembled graphics image data is stored in display frame buffer 170. In step 196, a determination is made as to whether the graphics image data stored in display frame buffer 170 is in compressed form. If the stored graphics image data is in compressed form, then in step 198 the stored graphics image data is decompressed, preferably by display decompression unit 176. In step 200, decompressed data is stored in display frame buffer 170.

If, in step 196, it is determined that the graphics image data stored in display frame buffer 170 is not in compressed form, then execution proceeds directly to step 202. In step 202, graphics image data is read from display frame buffer 170. Preferably, display refresh unit 178 reads the data from display frame buffer 170 and refreshes display unit 180 at the display refresh rate of display unit 180.

FIG. 9 is a flowchart 206 of a method of operation of a network attachable display device in accordance with another embodiment of the present invention. In step 208, graphics image data is received from a source device, such as a computer, a graphics device, a server, an Internet appliance and/or the like, for example source device 12 or graphics adapter 20, over a communication network, such as communication network 16 via display network interface port 182. The data is received preferably as a plurality of packets.

In step 210, a determination is made as to whether the graphics image data stored in display frame buffer 170 is in compressed form. If the graphics image data is in compressed form, then in step 212, display network interface 172 provides the graphics image data to display decompression unit 176 and the graphics image data is decompressed, preferably by display decompression unit 176, preferably "on the fly". For this purpose graphics image data received by display network interface 172 is transferred to display decompression unit 176 and display decompression unit 176 decompresses the graphics image data "on the fly".

If, in step 210, it is determined that the graphics image data stored in display frame buffer 170 is not in compressed form, then execution proceeds directly to step 214. In step 214, decompressed data is stored in display frame buffer 170.

In step 216, graphics image data is read from display frame buffer 170. Preferably, display refresh unit 178 reads the data from display frame buffer 170 and refreshes display unit 180 at the display refresh rate of display unit 180.

Preferably, display frame buffer 170 stores graphics image data corresponding to both a new image and a previous image. Graphics image data corresponding to the previous image is preferably graphics image data for the image currently displayed on display unit 180. Graphics image data corresponding to the new image is preferably graphics image data for the image to be displayed on display unit 180. Once display decompression unit 176 or display network interface 172 has stored graphics image data corresponding to the new image in display frame buffer 170, display refresh unit 178 may read graphics image data from the portion of display frame buffer 170 corresponding to the new image. After a new image has been displayed on display unit 180, the graphics image data corresponding to the previous image may be overwritten by the graphics image data for the new image. Thereafter, display refresh unit 178 may read graphics image data from the portion of display frame buffer 170 corresponding to the previous image and refresh display unit 180 at the display refresh rate.

The use of display frame buffer 170 to store graphics image data related to both the new image and the previous image prevents "tearing" of the displayed image which may otherwise result if the display refresh unit 178 is refreshing the display unit 180 at a rate which is faster than the rate at which graphics image data related to the new image is being written to display frame buffer 170. The use of display frame buffer 170 to store graphics image data related to both the new image and the previous image may be avoided if graphics image data corresponding to the new image is stored in display frame buffer 170 at least as fast as the rate at which display unit 180 is refreshed.

A technical advantage of an exemplary embodiment of the network attachable display device of the present invention is that graphics image data does not have to be transferred into the memory of a computer in order to be displayed on the network attachable display device. Because the network attachable display device may be directly connected to a communication network, graphics image data may be directly received over the communication network by the network attachable display device itself.

What is claimed is:

1. A method for transmitting graphics image data over a communication network, comprising:
   comparing graphics image data of a new image for a destination device with graphics image data of a previous image for said destination device stored in a frame buffer of a graphics adapter remote from said destination device, said graphics adapter rendering said graphics image data for said new image and said previous image;
   selecting blocks of graphics image data of said new image that are different from corresponding blocks of graphics image data of said previous image in a region of interest of said previous image specified by said destination device, wherein said region of interest is a portion of said previous image, and
   formatting, by said graphics adapter, said selected blocks of graphics image data of said new image into a plurality of packets for transmission by a network interface of said graphics adapter over said communication network.

2. The method of claim 1, further comprising transmitting said plurality of packets to said destination device over said communication network.

3. The method of claim 1, further comprising compressing said selected blocks of graphics image data prior to formatting said selected blocks of graphics image data.

4. The method of claim 1, further comprising adding identification information identifying said selected blocks to said plurality of packets.

5. The method of claim 4, wherein said identification information comprises block numbers for said selected blocks.

6. The method of claim 4, wherein said identification information comprises coordinate information for a plurality of corners of said selected blocks.

7. The method of claim 2, further comprising waiting for a request for graphics image data from said destination device.

8. A graphics processing system, comprising:
   a graphics adapter configured to compare graphics image data of a new image for a destination device with graphics image data of a previous image for said destination device stored in a frame buffer of said graphics adapter, said graphics adapter located remote from said destination device, said graphics adapter configured to render said graphics image data for said new image and said previous image, the graphics adapter configured to select blocks of graphics image data of said new image that are different from corresponding blocks of graphics image data of said previous image in a region of interest of said previous image specified by the destination device, wherein said region of interest is a portion of said previous image, and format said selected blocks of graphics image data of said new image into a plurality of packets for transmission by a network interface of said graphics adapter over a communication network.

9. The system of claim 8, wherein the graphics adapter is configured to transmit said plurality of packets to said destination device over said communication network.

10. The system of claim 8, wherein the graphics adapter is configured to compress said selected blocks of graphics image data prior to formatting said selected blocks of graphics image data.

11. The system of claim 8, wherein the graphics adapter is configured to add identification information identifying said selected blocks to said plurality of packets.

12. The system of claim 11, wherein said identification information comprises coordinate information for a plurality of corners of said selected blocks.

13. The system of claim 8, wherein the graphics adapter is configured to compare the graphics image data in response to receiving a request for graphics image data from said destination device.

* * * * *